(12) United States Patent
Ransom

(10) Patent No.: US 10,279,411 B2
(45) Date of Patent: May 7, 2019

(54) PROTECTIVE COVER FOR CUTTING TORCH TIP

(71) Applicant: Jeffery C. Ransom, Caldwell, ID (US)

(72) Inventor: Jeffery C. Ransom, Caldwell, ID (US)

( * ) Notice: Subject to any disclaimer, the term of this patent is extended or adjusted under 35 U.S.C. 154(b) by 152 days.

(21) Appl. No.: 15/048,002

(22) Filed: Feb. 19, 2016

(65) Prior Publication Data

US 2017/0239743 A1 Aug. 24, 2017

(51) Int. Cl.
*B23K 7/10* (2006.01)

(52) U.S. Cl.
CPC ....................... *B23K 7/10* (2013.01)

(58) Field of Classification Search
CPC .. B23K 7/00; B23K 5/22; F23D 14/38; F23D 14/465; Y10S 266/902
See application file for complete search history.

(56) References Cited

U.S. PATENT DOCUMENTS

| | | | | |
|---|---|---|---|---|
| 1,652,283 A * | 12/1927 | Lewis | .................... | B23Q 13/00 408/241 R |
| 2,177,531 A * | 10/1939 | Maxwell | ................ | B23Q 13/00 150/154 |
| 2,669,644 A * | 2/1954 | Wetzel | .................. | A61J 11/009 219/229 |
| 3,329,188 A * | 7/1967 | McCord, Jr. | ........... | B23Q 13/00 30/151 |
| 3,375,090 A | 3/1968 | Marra | | |
| 3,463,403 A | 8/1969 | Marra | | |
| 3,899,828 A * | 8/1975 | Bosco | ..................... | B26B 21/40 30/151 |
| 4,600,125 A * | 7/1986 | Maynard, Jr. | ............ | B67B 7/28 141/330 |
| 5,127,890 A * | 7/1992 | Noren | .................... | A63B 65/02 482/20 |
| 5,560,518 A * | 10/1996 | Catterall | ................ | B65D 35/28 222/105 |
| 5,701,998 A * | 12/1997 | Perry | ..................... | A63B 60/58 16/436 |
| 5,741,128 A * | 4/1998 | Tsai | ........................ | F23D 14/28 126/407 |
| 5,980,495 A * | 11/1999 | Heinz | ................. | A61M 5/3202 128/919 |
| 6,339,980 B1 * | 1/2002 | Woolf | .................... | B25B 13/58 81/185 |
| 6,340,038 B1 * | 1/2002 | Ingram | ................... | B67C 11/02 141/333 |

(Continued)

OTHER PUBLICATIONS

MOCAP, http://www.mocap.com/hightempvinyltaperedplugs.html, Mar. 11, 2015.*

*Primary Examiner* — Erin B Saad
*Assistant Examiner* — Carlos J Gamino
(74) *Attorney, Agent, or Firm* — Sean D. Burdick

(57) ABSTRACT

A protective cutting torch tip cover system is provided, for use with an oxygen and acetylene cutting torch having a conical torch tip having a plurality of ports through which oxygen and acetylene gases pass prior to combustion, which includes a generally conical shaped cover formed of elastomeric material and configured for elastic frictional engagement with said cutting torch tip and a protective cover storage device for holding the protective cover up and away from the torch flame when not installed on the torch tip.

5 Claims, 3 Drawing Sheets

(56) References Cited

U.S. PATENT DOCUMENTS

| | | | | |
|---|---|---|---|---|
| 6,729,480 B1* | 5/2004 | Blake | ............ | B25F 5/006 |
| | | | | 206/379 |
| 6,964,545 B1* | 11/2005 | Languasco | ............ | B25F 5/021 |
| | | | | 206/372 |
| 7,722,250 B2* | 5/2010 | Weng | ............ | G01J 5/02 |
| | | | | 374/158 |
| 8,011,541 B2* | 9/2011 | Mikesell | ............ | B25H 3/006 |
| | | | | 224/250 |
| 8,066,268 B2* | 11/2011 | Brauer | ............ | B25F 5/029 |
| | | | | 269/130 |
| 8,961,865 B2 | 2/2015 | Plut | | |
| 9,302,374 B1* | 4/2016 | Cusenza | ............ | B25B 13/58 |
| 9,632,305 B2* | 4/2017 | Peters | ............ | G02B 23/2484 |
| 9,701,008 B2* | 7/2017 | Cho | ............ | B25F 5/029 |
| 2005/0245802 A1* | 11/2005 | Kanngiesser | ............ | A61B 46/10 |
| | | | | 600/398 |
| 2008/0179309 A1* | 7/2008 | Markovsky | ............ | B23K 3/026 |
| | | | | 219/229 |
| 2011/0008557 A1* | 1/2011 | Zeyfang | ............ | B65D 59/06 |
| | | | | 428/36.8 |
| 2012/0193002 A1* | 8/2012 | Tracy | ............ | D06F 79/06 |
| | | | | 150/165 |
| 2013/0014829 A1 | 1/2013 | Langley | | |
| 2014/0145380 A1 | 5/2014 | Plut | | |
| 2014/0199878 A1* | 7/2014 | Ihde | ............ | B23K 9/32 |
| | | | | 439/367 |
| 2014/0376903 A1* | 12/2014 | Garber | ............ | G03B 11/041 |
| | | | | 396/448 |
| 2015/0024085 A1* | 1/2015 | McBean | ............ | A61J 11/04 |
| | | | | 426/2 |
| 2015/0330549 A1* | 11/2015 | Drane | ............ | F16L 55/115 |
| | | | | 138/89 |

\* cited by examiner

PROTECTIVE COVER FOR CUTTING TORCH TIP

TECHNICAL FIELD

The presently disclosed technology relates to a protective cutting torch tip cover, for use with an oxygen and acetylene cutting torch having a conical torch tip having a plurality of ports through which oxygen and acetylene gases pass prior to combustion, which comprises a generally conical shaped cover formed of elastomeric material and configured for elastic frictional engagement with said cutting torch tip.

BACKGROUND

FIG. 1 discloses a typical prior art oxyacetylene cutting torch 1, which would be coupled to at least two gas cylinders, one containing acetylene, and the other oxygen by gas lines attached to couplers 7 and 8. Torch handle 2 is provided as a secure place for the operator's hands when using the cutting torch 1. The torch handle may include one or more gas flow adjustments, typically needle, valves 3 to regulate the amount of oxygen and acetylene flowing through gas lines 4 to the torch tip 6. One gas line 4 supplies acetylene to the cutting torch tip 6, and the other two gas lines 4 are used to supply oxygen to torch tip 6.

The torch tip 6 typically has a centrally located orifice through which acetylene gas flows. This is usually surrounded by a plurality of even smaller orifices through which oxygen flows; some of these oxygen orifices are used to supply oxygen for the oxyacetylene flame to sustain the burn, and the remainder of the oxygen orifices are used to supply extra oxygen needed to burn iron during the cutting process. These orifices are very small, usually just a few thousandths of an inch in diameter, and they will clog easily if the cutting torch is placed on the ground, or dropped for some reason. And once clogged, it is nearly impossible to clean them out; the conventional wisdom being that the tip will never work as good again, and should be replaced.

One of the two oxygen gas lines is used in conjunction with the acetylene to sustain a continuous burn of oxyacetylene, in a similar fashion to a conventional welding torch. The second oxygen gas line is controlled by an oxygen blast trigger 5 to inject higher volumes of oxygen to the work piece being cut. The oxyacetylene flame is adjusted by adjusting the amount of oxygen that mixes with the acetylene after being ejected from torch tip 6. Usually the person operating the cutting torch will add oxygen by opening the oxygen needle adjustment valve until the operator sees only two flame zones in the flame, with a light blue inner cone and a darker blue to colorless outer cone. The inner cone is where the acetylene and the oxygen combine, and the tip of this inner cone is the hottest part of the flame at approximately 6,000° F. (3,300° C.) and provides enough heat to easily melt steel.

The metal to be cut is first heated by the flame until the metal is cherry red. Once the work piece is heated to this temperature, extra oxygen is supplied by depressing the oxygen blast trigger. This oxygen reacts with the metal forming iron oxide and producing heat. It is this heat that continues the cutting process. The cutting torch only heats the metal to start the process; further heat is provided by the burning metal.

The melting point of the iron oxide is around half that of the metal; as the metal burns, it immediately turns to liquid iron oxide and flows away from the cutting zone. However, some of the iron oxide remains on the work piece, forming a hard "slag" which should be removed by gentle tapping and/or grinding.

A big problem is what to do with a cutting torch when it is being used intermittently in an outdoor environment, for example by a well driller who uses the torch intermittently to cut metal, or holes in metal well casing pipes. A clean, dry and secure resting place is needed, so as to not clog the torch tip orifices. U.S. Pat. No. 8,961,865 attempts to solve the problem with a loose fitting metal torch tip protector which is secured to the torch tip by means of a hook and spring assembly to hold the tip protector in place when it is engaged with the torch tip. There are a number of drawbacks to this design, not the least of which is that the torch tip protector, when not in use, is dangling below the cutting torch where it is exposed to heat and molten slag during the cutting process, and also can become ensnared with the work piece. Another practical problem is the material the tip protector is made from is a rigid metal piece and retains heat; while it can be disconnected and removed from the cutting torch, where does the welder using the torch put it once removed? It is hot and bulky, so it cannot be put in a shirt or trouser pocket, so it is usually set down someplace where it can fall to the ground and become contaminated with mud or dirt, or be misplaced and lost.

The ideal torch tip protective cover would be made of an elastomeric material that can frictionally or elastomerically engage with the torch tip and remain in place during the normal expansion and contraction of the torch tip during heat up and cool down, easily removed and installed by a welder wearing gloves; it should be flexible and resistant to heat absorption so that it could be safely stored in a shirt or trouser pocket, and be made of a brightly colored material and distinctive color so that it can be easily spotted and retrieved if dropped on the ground at a work site.

SUMMARY OF THE DISCLOSURE

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

Still, other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

My new torch tip protector is a single, unitary molded piece that is sized to fit a cutting torch tip, and elastically or elastomerically stay in frictional engagement therewith. The welder can pull it off the torch tip with one hand, and either stuff the protective cover in a pocket, or optionally, push it down onto protective tip cover holder which is sized and shaped to be similar to the size and shape of the torch tip, and is held in place by attachment bracket. When the cover holder is installed on the cutting torch, it positions the protective cover above the cutting torch, and holds the protective cover up and away from the cutting torch and firmly in place in a convenient and safe location where the welder can easily retrieve the protective cover and reinstall it on torch tip.

DETAILED DESCRIPTION OF THE PREFERRED EMBODIMENTS

Figure 1:
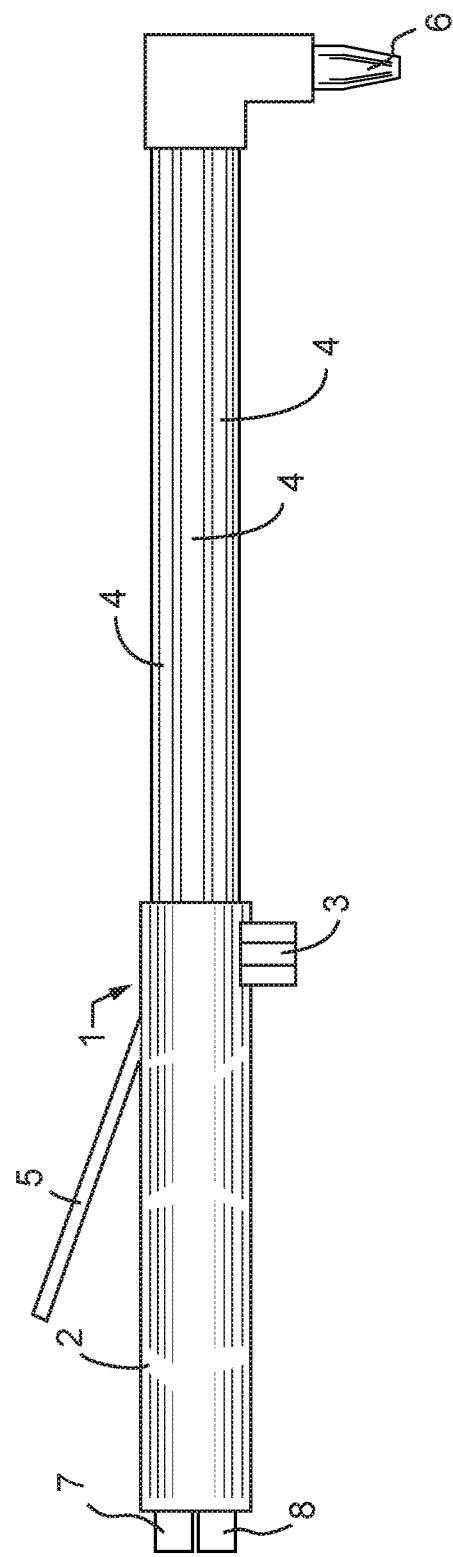
FIG. 1 is prior art side view of a prior art oxyacetylene cutting torch.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Figure 3:
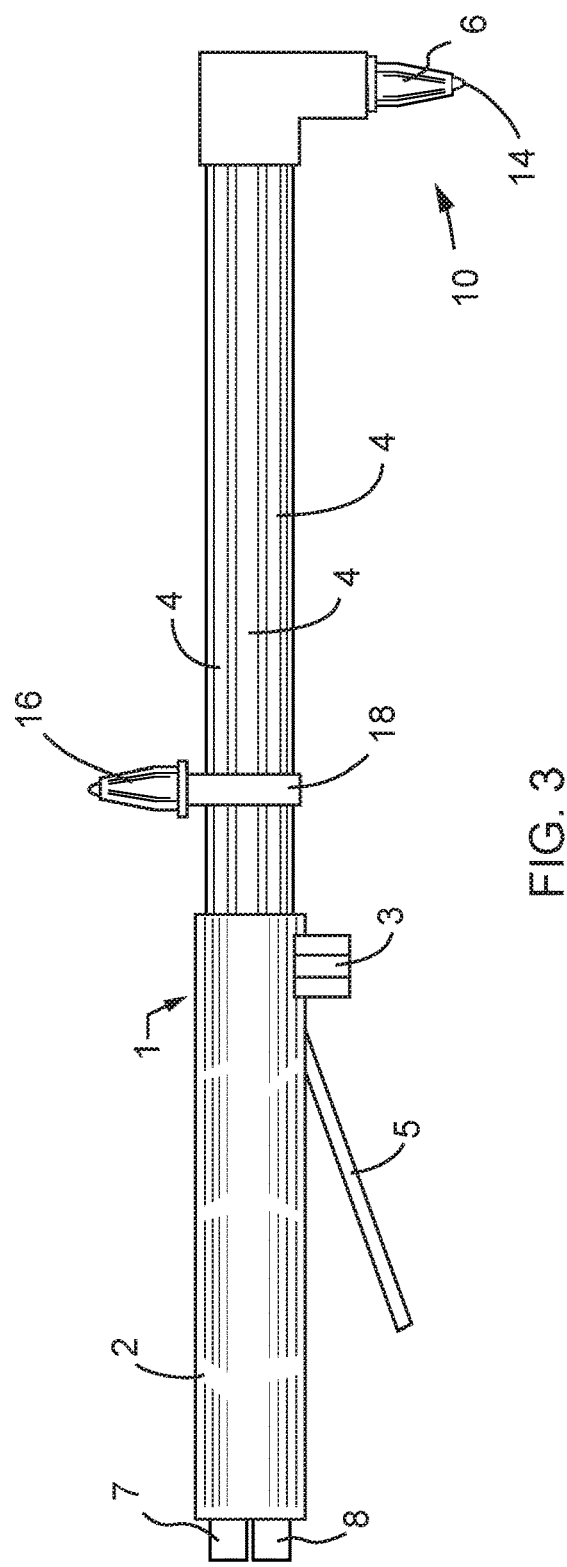
FIG. 3 is a side view of my protective cover system attached to a modified prior art oxyacetylene cutting torch.

FIG. 3 discloses a modified prior art oxyacetylene cutting torch 1 of the same type disclosed in FIG. 1, which would be coupled to at least two gas cylinders, one containing acetylene, and the other oxygen by gas lines attached to couplers 7 and 8. Torch handle 2 is provided as a secure place for the operators hands when using the cutting torch 1. The torch handle may include one or more gas flow adjustment, typically needle, valves 3 to regulate the amount of oxygen and acetylene flowing through gas lines 4 to the torch tip 6. One gas line 4 supplies acetylene to the cutting torch tip 6, and the other two gas lines 4 are used to supply oxygen to torch tip 6.

One of the two oxygen gas lines is used in conjunction with the acetylene to sustain a continuous burn of oxyacetylene, in a similar fashion to a conventional welding torch. The second oxygen gas line is controlled by an oxygen blast trigger 5 to inject higher volumes of oxygen to the work piece being cut. The oxyacetylene flame is adjusted by adjusting the amount of oxygen that mixes with the acetylene after being ejected from torch tip 6. Usually the person operating the cutting torch will add oxygen by opening the oxygen needle adjustment valve until the operator sees only two flame zones in the flame, with a light blue inner cone and a darker blue to colorless outer cone. The inner cone is where the acetylene and the oxygen combine, and the tip of this inner cone is the hottest part of the flame at approximately 6,000° F. (3,300° C.) and provides enough heat to easily melt steel.

However, the actual torch tip 6 does not get nearly that hot. Combustion of the acetylene does not occur in or on the tip, but at some finite distance away from the tip and the gas flow is also away from the end of the tip. In actual experimental measurements it has been found that the torch tip temperature is less than 200° F. within a few seconds of the cutting torch being shut off, and in relatively cool ambient outdoor temperature conditions the torch tip will cool to approximately 85° F. in about 90 seconds.

Figure 2:
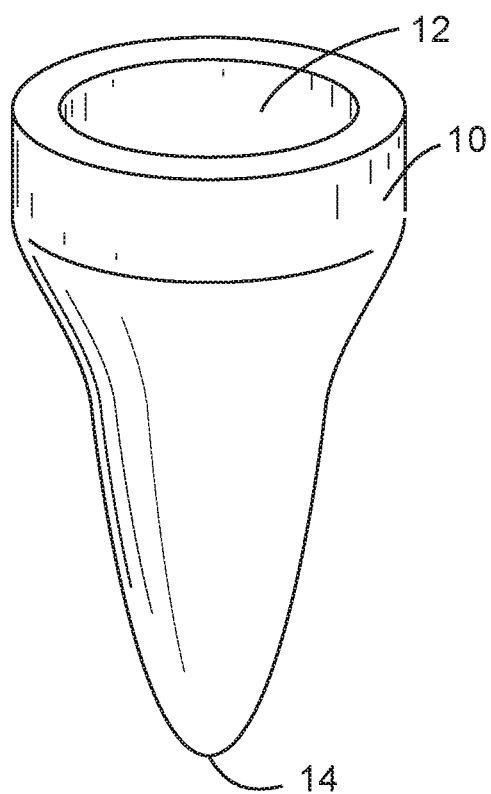
FIG. 2 is a perspective representational view of my new protective cover.

FIG. 2 discloses my new design for my new torch tip protector cover 10, which is a single, unitary molded piece of a suitable elastomeric rubber compound with a defined interior cavity 12 culminating at tip 14 that is sized to conform to the particular size and shape of torch tip 6 and to elastically or elastomerically stay in frictional engagement with torch tip 6 when installed. There are a number of resilient rubber and rubber like compounds which have useful temperature ranges that are suitable for the temperature ranges incurred by a cutting torch tip cover. One such compound is Aeromarine 128 Silicone Moldmaking Rubber produced and sold by AeroMarine Products, Inc of San Diego, Calif., which has a useful temperature range of −50° F. to +325° F. Another silicone mold making rubber is High Strength 3 Silicone Mold Making Rubber produced and marketed by Alumilite, Inc. of Kalamazoo, Mich., which has a suitable useable temperature range of −67° F. to +395° F. and is highly flexible, and can be dyed distinctive colors.

As shown in FIG. 3, a protective tip cover holder 16 is attached to the cutting torch by means of bracket 18. In the preferred embodiment, protective tip cover holder 16 conforms in size and shape to match torch tip 6 so as to frictionally or elastically hold in engagement protective cover 10. While this is the preferred design, all that is required is that the holder 10 be sized and shaped to elastically hold the protective cover 10 up and away from the cutting end of the torch. The welder can pull the torch tip protective cover 10 off the torch tip 6 with one hand, and either stuff the protective cover 10 in a pocket, or optionally, push it down onto protective tip cover holder 16, where it remains frictionally engaged. When protective tip cover holder 16 is installed on the cutting torch, it positions the protective cover 10 above the cutting torch, and holds the protective cover 10 firmly in place in a convenient and safe location where the welder can easily retrieve protective cover 10 and reinstall it on torch tip 6. In the protective cover system shown in FIG. 3, the protective tip cover holder 16 is located approximately midway along the length of cutting torch 1, between gas line couplers 7, 8 and torch tip 6. FIG. 3 also shows protective tip cover holder 16 mounted to cutting torch 1 so that protective tip cover holder 16 points in a direction opposite to the direction in which torch tip 6 points.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

I claim:

1. A protective cutting torch tip cover system for use with an oxygen and acetylene cutting torch having a conical torch tip having a plurality of ports through which oxygen and acetylene gases pass prior to combustion, the system comprising:

a generally conical shaped protective cover formed of elastomeric material and configured in size and shape for elastic frictional engagement with said torch tip;

a generally conical shaped cover holder configured in size and shape for elastic frictional engagement with said protective cover; and means for attaching said cover holder to said cutting torch in an orientation wherein when said protective cover is in elastic frictional engagement with said cover holder the protective cover is held above and away from the torch tip.

2. The protective cutting torch tip cover system of claim 1 wherein the cover holder is located approximately midway along the length of the cutting torch.

3. The protective cutting torch tip cover system of claim 1 wherein the cover holder is mounted to the cutting torch so that the cover holder points in a direction opposite to a direction in which the torch tip points.

4. The protective cutting torch tip cover system of claim 1 wherein the elastomeric material is a rubber based compound having a useful working temperature of at least 300 degrees F.

5. The protective cutting torch tip cover system of claim 1 wherein the elastomeric material is dye colored.

* * * * *